(12) United States Patent
Hazlebeck

(10) Patent No.: US 6,238,568 B1
(45) Date of Patent: May 29, 2001

(54) HYDROTHERMAL PROCESSING WITH PHOSPHATE ADDITIVE

(75) Inventor: David A. Hazlebeck, El Cajon, CA (US)

(73) Assignee: General Atomics, San Diego, CA (US)

( * ) Notice: Subject to any disclaimer, the term of this patent is extended or adjusted under 35 U.S.C. 154(b) by 0 days.

(21) Appl. No.: 09/306,594

(22) Filed: May 6, 1999

(51) Int. Cl.$^7$ ........................................................ C02F 1/72
(52) U.S. Cl. ........................ 210/697; 210/753; 210/754; 210/761; 588/208; 588/218; 588/226
(58) Field of Search ................................. 210/697, 698, 210/723, 724, 717, 761, 762, 763, 767, 753, 754; 588/208, 218, 226

(56) References Cited

U.S. PATENT DOCUMENTS

| | | |
|---|---|---|
| 2,805,921 | 9/1957 | Schaumann . |
| 2,886,418 | 5/1959 | Altimier . |
| 4,272,383 | * 6/1981 | McGrew ............................ 210/741 |
| 4,338,199 | 7/1982 | Modell . |
| 4,543,190 | 9/1985 | Modell . |
| 4,713,177 | * 12/1987 | Atwood et al. ....................... 210/697 |
| 4,822,497 | 4/1989 | Hong et al. . |
| 5,100,560 | 3/1992 | Huang . |
| 5,200,093 | 4/1993 | Barner et al. . |
| 5,252,224 | 10/1993 | Modell et al. . |
| 5,358,645 | 10/1994 | Hong et al. . |
| 5,387,398 | 2/1995 | Mueggenburg et al. . |
| 5,427,764 | 6/1995 | Barber . |
| 5,437,798 | 8/1995 | LaRoche et al. . |
| 5,492,634 | 2/1996 | Hong et al. . |
| 5,501,799 | 3/1996 | Bond et al. . |
| 5,527,471 | 6/1996 | Hong et al. . |
| 5,543,057 | 8/1996 | Whiting et al. . |
| 5,545,337 | 8/1996 | Hong . |
| 5,545,472 | 8/1996 | Koubek et al. . |
| 5,552,039 | 9/1996 | McBrayer, Jr. et al. . |
| 5,558,783 | 9/1996 | McGuinness . |

(List continued on next page.)

FOREIGN PATENT DOCUMENTS

WO 96/02471  2/1996  (WO) .

OTHER PUBLICATIONS

Jacobs, G.P. et al., *Utilization of Phoenics in the Design of the Modar Scwo Reactor*, pp. 6, and 7, and Figures 3, 8 and 9, Presented in session "Reactions in Supercritical Fluids," Annual AICHE Meeting, Miami Beach, Florida, Nov. 1–6, 1992.

Kochan, R. J. et al., *CFD Code Selection and Preliminary Validation for Thermal–Hydraulic Analysis of SCWO Benchscale Reactor*, p. 17, Idaho National Engineering Laboratory, Idaho Falls Idaho, 83415, Dec., 1994.

Kochan, R. J. et al., *CFD Model Development and Data Comparison for Thermal–Hydraulic Analysis of HTO Pilot Scale Reactor*, p. 18 and Figure 3, Idaho National Engineering Laboratory, Idaho Falls Idaho, 83415, Sep., 1995.

Hong, Glenn T., et al., *Material Testing in Supercritical Water Oxidation Systems*, Session VIII: Materials Testing; Corrosion Experiments, 9 pages, First International Workshop on Supercritical Water Oxidation, Jacksonville, Florida, Feb. 6–9, 1995.

*Primary Examiner*—Peter A. Hruskoci
(74) *Attorney, Agent, or Firm*—Nydegger & Associates

(57) ABSTRACT

A system (10) and method for hydrothermal treatment of a feed material (11) includes a reaction chamber (14) in a reactor (12). Importantly, an additive (16) is added with the feed material (11) to the reaction chamber (14). The additive (16) causes a reaction medium (18) in the reaction chamber (14) to include phosphate compounds. The phosphate compounds allow precipitating salts to be transported through the reactor (12) without plugging and inhibiting the build-up of precipitating salts in the reaction chamber (14).

33 Claims, 7 Drawing Sheets

U.S. PATENT DOCUMENTS

| | | |
|---|---|---|
| 5,560,822 | 10/1996 | Bond et al. . |
| 5,560,823 | 10/1996 | Whiting . |
| 5,560,872 | 10/1996 | Rahman et al. . |
| 5,571,423 | 11/1996 | Daman . |
| 5,571,424 | 11/1996 | Ahluwalia . |
| 5,591,415 | 1/1997 | Dassel et al. . |
| 5,620,606 | 4/1997 | McBrayer, Jr. et al. . |
| 5,667,698 | 9/1997 | Whiting . |
| 5,670,040 | 9/1997 | Ahluwalia . |
| 5,674,405 | 10/1997 | Bourhis et al. . |
| 5,683,587 * | 11/1997 | Ferrara et al. ............ 210/696 |
| 5,723,045 | 3/1998 | Daman . |
| 5,755,974 | 5/1998 | McBrayer, Jr. et al. . |

* cited by examiner

HYDROTHERMAL PROCESSING WITH PHOSPHATE ADDITIVE

FIELD OF THE INVENTION

The present invention pertains generally to a method and system for wet oxidation. The present invention is particularly, but not exclusively, useful as a method and system for hydrothermal treatment in a reactor which minimizes build-up or plugging of precipitating salts in the reactor and other equipment.

BACKGROUND

The process of wet oxidation involves the addition of an oxidizing agent, typically air or oxygen, to an aqueous stream at elevated temperatures and pressures. The resultant "combustion" of organic or inorganic oxidizable materials occurs directly within the aqueous phase.

A significant development in the field of wet oxidation occurred with the issuance of U.S. Pat. No. 4,338,199, to Modell on Jul. 6, 1982. The Modell '199 patent discloses a wet oxidation process which is known as supercritical water oxidation ("SCWO"). In some implementations of the SCWO process, oxidation occurs essentially entirely at conditions which are supercritical in both temperature (>374° C.) and pressure (>about 3,200 psi or 220 bar). Importantly, the SCWO process gives rapid and complete oxidation of virtually any organic compound in a matter of seconds.

A related process, known as supercritical temperature water oxidation ("STWO"), can provide similar oxidation effectiveness for certain feedstocks, but at a lower pressure. This process is described in U.S. Pat. No. 5,106,513, issued Apr. 21, 1992 to Hong, and utilizes temperatures in the range of six hundred degrees Celsius (600° C.) and pressures between 25 bar to 220 bar.

The various processes for oxidation in an aqueous matrix are referred to collectively as hydrothermal oxidation, if carried out at temperatures between about three hundred seventy-four degrees Celsius to eight hundred degrees Celsius (374° C.–800° C.), and pressures between about 25 bar to 1,000 bar. A somewhat related process in which an oxidant is largely or entirely excluded from the system in order to form products which are not fully oxidized is called hydrothermal reforming. The processes of hydrothermal oxidation and hydrothermal reforming will hereinafter be jointly referred to as "hydrothermal treatment."

A common difficulty with some hydrothermal applications is precipitating of salts during processing, including salts which are normally water soluble such as sodium chloride (NaCl). The salt precipitants deposit on surfaces in the reactor and cause plugging of the reactor or other equipment. Further, the salt can cause fouling of heat transfer surfaces in the system. The build-up of salt precipitates can eventually necessitate an online or off-line cleaning of the system.

Many approaches have been tried to prevent or inhibit the salt precipitates from plugging the reactor and/or the formation of salt precipitates. Examples of prior approaches include (i) alternating reactors, (ii) a reversing flow reactor, (iii) a brine pool at the bottom of the reactor, (iv) adding inert particles to the feed material, (v) adding molten salts to the feed material, (vi) purge through a porous wall of the reactor, (vii) adding a cooler stream at the wall of the reactor, (viii) using a mechanical scraper, and/or (ix) using high velocity flow in the reactor. Unfortunately, these approaches include one or more of the following drawbacks: expensive, limited success in inhibiting salt accumulation, reduce efficiency of the system, and/or create a corrosion/materials problem.

Another common difficulty with some hydrothermal applications is the generating of reaction products which contain corrosive elements such as acids or bases. The corrosive elements damage the reactor and the system.

Many approaches have been tried to inhibit the formation of corrosive elements and/or to minimize the damage caused by the corrosive elements. Example of prior approaches include (i) neutralizing the feed material with a neutralizing agent, (ii) using a corrosion resistant liner in the reactor, (iii) using cold flow near the wall of the reactor, and/or (iv) purging through a porous wall of the reactor. Unfortunately, these approaches include one or more of the following drawbacks: expensive to manufacture and operate, limited success in minimizing damage caused by the corrosive elements, not applicable to all process streams, and/or creates salt precipitates which plug the reactor.

In light of the above, it is an object of the present invention to provide a system and method for hydrothermal treatment which continuously and reliably handles reaction medium containing or generating precipitating salts. Another object of the present invention is to provide a system and method for hydrothermal treatment of corrosive reaction medium. Still another object of the present invention is to provide a system and method for hydrothermal treatment which allow precipitating salts to be transported through the reactor without plugging. Yet another object of the present invention is to provide a system and method for accomplishing hydrothermal treatment which is easy to implement, simple to use, and relatively inexpensive to operate.

SUMMARY

A system for performing hydrothermal treatment of a feed material is provided herein. The hydrothermal treatment is typically performed in a reaction chamber of a reactor at temperatures in a range of between three hundred seventy-four degrees Celsius (374° C.) to about eight hundred degrees Celsius (800° C.) and at pressures above about 25 bars. Uniquely, an additive is mixed with the feed material to produce a reaction medium in the reaction chamber which contains phosphate.

Importantly, the present invention recognizes that phosphate assists in the transport of precipitating salts in the reactor, inhibits excessive build-up of salts in the reactor and inhibits plugging of the hydrothermal treatment system. With the present invention, the precipitating salts may initially accumulate slightly on the reactor wall. Subsequently, the salts transport through the reactor. Further, as a result of the present invention, corrosive elements in the reaction medium can be neutralized because the phosphate allows any precipitants, created by neutralization, to be transported through the reactor.

As provided herein, the additive adjusts the composition of the reaction medium so that the reaction medium contains phosphate salt. Preferably, the phosphate salt includes a mono-basic phosphate salt such as monosodium phosphate. The adjustment to the reaction medium can be made with an additive which includes one or more (i) phosphate salts, (ii) phosphorus containing compounds, (iii) phosphoric acids, (iv) organo-phosphates, (v) neutralizing compounds, (vi) neutralizing agents, and/or (vii) a combination thereof.

The exact percentage of phosphate in the reaction medium depends upon the type of feed material utilized and the type of additive utilized. It is anticipated that a phosphate concentration of between approximately one and 100 percent of the total salts in the reaction medium will significantly inhibit build-up of precipitating salts. Preferably, the phosphate concentration in the reaction medium is between 10 and 100 percent of the total salts in the reaction medium. Depending upon the reaction medium, higher phosphate concentrations may be necessary. For example, a phosphate concentration of between approximately 50 to 100 percent of the total salts in the reaction medium may be beneficial for the transport of precipitating salts.

A suitable phosphate compound can be selected from a group which includes $H_3PO_4$, $NaH_2PO_4$, $Na_2HPO_4$, $Na_3PO_4$, $(NH_4)_3PO_4$, $(NH_4)_2HPO_4$, $(NH_4)H_2PO_4$. Alternately, the phosphate compound can be selected from a group which includes $KH_2PO_4$, $K_2HPO_4$, or $K_3PO_4$.

A suitable neutralizing compound can be selected from a group which includes NaOH, $NaHCO_3$, $Na_2CO_3$, KOH, $KHCO_3$, $K_2CO_3$, $Ca(OH)_2$, CaO, $CaCO_3$, $NaNO_3$, $NaNO_2$, $KNO_3$, $KNO_2$, $Ca(NO_3)_2$, $Na_3PO_4$, $Na_2HPO_4$, $KPO_4$ and $K_2HPO_4$. Alternately, the neutralizing compound can be selected from a group which includes $H_3PO_4$, HCl, $H_2SO_4$, HF, $NH_4Cl$, $NH_4ClO_4$, $(NH_4)_3PO_4$, $(NH_4)_2HPO_4$ and $(NH_4)H_2PO_4$. Still alternately, the neutralizing compound can be an organic compound which contains one or more of the elements chlorine (Cl), sulfur (S), phosphorus (P), or fluorine (F). In yet another alternate embodiment, the neutralizing compound can be an organic salt.

The specific type of additive utilized varies according to the type of feed material which is being processed. For example, if the feed material is acidic, then the additive can include a neutralizing agent and a phosphate generating compound. Alternately, an additive including a phosphate compound containing neutralizing cations such as $Na_2HPO_4$ or $Na_3PO_4$ can be added to an acidic feed material so that the resulting reaction medium contains some mono-basic phosphate and the other acids are neutralized to salts. Still alternately, an additive including a combination of a neutralizing agent and a cation containing phosphate compounds could be used with an acidic feed material.

If the feed material contain bases or base generating compounds, then the additive can include an acid-generating compound to reduce the pH level to less than approximately 7. If the feed material already contains phosphate, the additive can include a neutralizing compound to insure that the reaction medium includes mono-basic phosphate (typical effluent pH level of approximately 1 to 7), without fully neutralizing to dibasic phosphate (typical effluent pH level of greater than approximately 8).

The additive can include a separate neutralizing agent, added to the feed material. Alternately, the additive can be used to aid in the transport of salt and as neutralizing agent by providing phosphorus. This can be done for a feed material which contains bases or base generating compounds with $H_3PO_4$, ammonium phosphate, and/or an organo-phosphorus compound. Alternately, this can be done for a feed material which contains acids or acid generating compounds with phosphate salts, $Na_3PO_4$, $Na_2HPO_4$, $K_3PO_4$, $K_2HPO_4$ or phosphorus containing salts.

As indicated above, it is an important characteristic of the present invention that plugging and build up of precipitating salts in the reaction chamber are minimized with an additive which causes the reaction medium to contain phosphate. It is to be appreciated that the phosphate in the reaction medium inhibits the build-up of sticky, precipitating salts in the reaction chamber. This allows for continuous, steady-state operation of the reaction chamber without shutdowns to clean the reaction chamber.

The present invention can be used for the generation of useful heat, to produce power, to destroy waste, to convert waste to useful products, and/or to convert one or more materials to a useful product.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
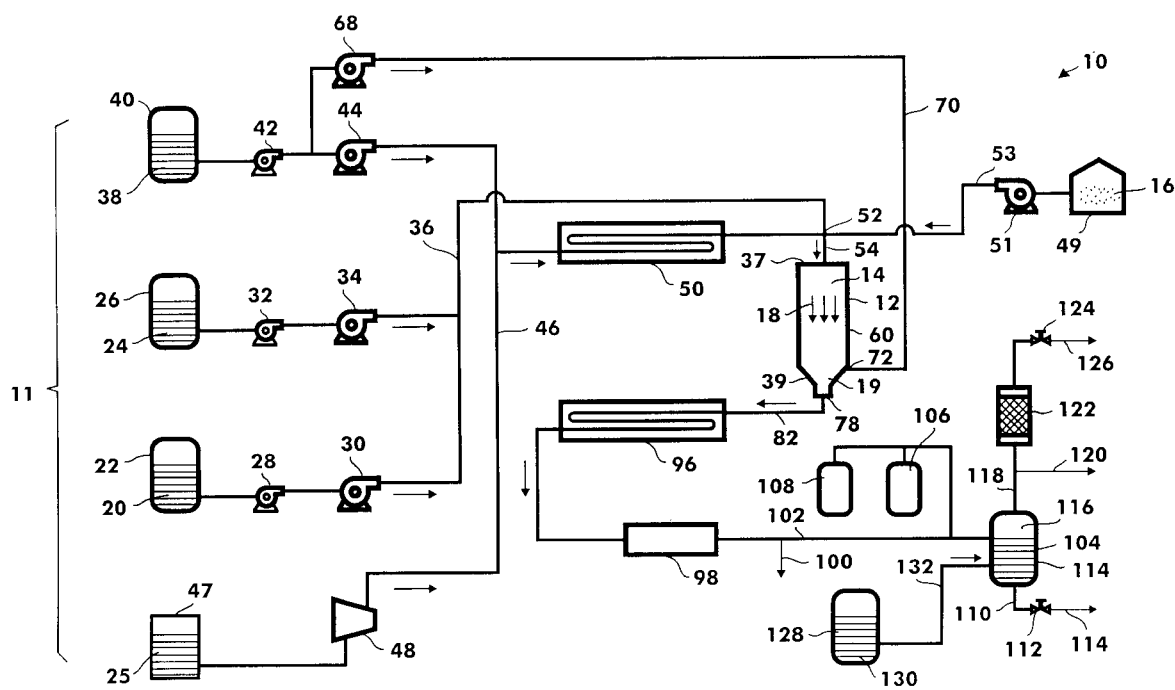
FIG. 1 is a schematic diagram of the components of a system in accordance with the present invention.

Referring initially to FIG. 1, a hydrothermal treatment system 10 for a feed material 11 is provided herein. As illustrated, the system 10 includes a reactor 12 having a reaction chamber 14. Importantly, an additive 16 is mixed with the feed material 11 to produce a reaction medium 18 which contains phosphate at some time in the reaction chamber 14. The present invention recognizes that phosphate assists in the transport of precipitating salts in the reactor 12 and inhibits precipitating salts from excessively building up in the reactor 12. With the present invention, the precipitating salts may accumulate slightly in the reactor 12. Subsequently, the salts are transported through the reactor 12. Further, as a result of the present invention, corrosive elements in the reaction medium 18 can be neutralized because the phosphate allows any precipitants, created by neutralization, to be transported through the reactor 12.

The hydrothermal treatment is typically performed in the reaction chamber 14 at temperatures in a range of between three hundred seventy four degrees Celsius (374° C.) to about eight hundred degrees Celsius (800° C.) and at pressures beween about 25 bars and 1000 bars. However, the hydrothermal treatment can begin below 374° C. Further, the temperature of the reaction medium 18 during hydrothermal treatment can be greater than about 500° C., 750° C., or 900° C.

The feed material 11 can, in certain embodiments, include at least four separate identifiable constituents. These are: (1) a reactant 20 to be processed; (2) an auxiliary fuel 24, if necessary to sustain reaction in the reaction chamber 14; (3) water 38; and (4) an oxidant 25. The constituents of the feed material 11 and the additive 16 can be added to the reaction chamber 16 in many alternate ways.

FIG. 1 illustrates the reactant 20 initially held in a holding tank 22. The reactant 20 can consist of organic material, inorganics, particulates, sludge, soil, neutralizing agents, salt-forming agents, minerals, and/or combustible material. As indicated in FIG. 1, it may be necessary to combine this reactant 20 with an auxiliary fuel 24, such as ethanol, which can be initially held in a holding tank 26.

The reactant 20 and the auxiliary fuel 24 can be pressurized before being introduced into the reaction chamber 14. Specifically, a transfer pump 28 and high pressure pump 30 are used to pressurize the reactant 20. Similarly, a transfer pump 32 and a high pressure pump 34 are used to pressurize the auxiliary fuel 24. In the system 10 illustrated in FIG. 1, the reactant 20 and auxiliary fuel 24 are combined in line 36 and transferred to a top end 37 of the reaction chamber 14. It is to be noted that while the reactant 20 and auxiliary fuel 24 are respectively pressurized by high pressure pumps 30 and 34 to pressures above about 220 bar or 3200 psi, they are not necessarily raised in temperature prior to being introduced into the reaction chamber 14. Thus, as intended for the system 10, the reactant 20 can be introduced into the reaction chamber 14 at ambient temperature or preheated above ambient temperature. For example, the reactant 20 can be preheated to enter the reaction chamber 14 above 374° C. or below 374° C.

In the embodiment illustrated in FIG. 1, in addition to the reactant 20 and auxiliary fuel 24, the feed material 11 includes pressurized water 38 and a pressurized oxidant 25. Specifically, water 38 is drawn from holding tank 40 by transfer pump 42 and is thereafter pressurized by high pressure pump 44 before it is passed into line 46. At the same time, the oxidant 25 from holding tank 47, is pressurized by a compressor 48 and is passed into the line 46.

For purposes of the present invention, the oxidant 25 can be air, pure liquid or gaseous oxygen, enriched air, hydrogen peroxide, nitric acid, nitrous acid, nitrate, and nitrite. In a preferred embodiment of the present invention, the oxidant 25 is selected from a group which includes air, oxygen, $H_2O_2$, $HNO_3$, $HNO_2$, $NaNO_3$, $NaNO_2$, $NH_4NO_3$, $NH_4NO_2$, $KMnO_4$, $NH_4ClO_4$. Alternatively, a substoichiometric amount of oxidant can be used for applications in which partial oxidation of the reactant 20 is desired.

In any event, at this point the pressurized water 38 and oxidant 25 are mixed and introduced into a preheater 50. The heating of the pressurized water/air mixture in preheater 50 can be accomplished in several ways. For example, this preheat may be accomplished by a regenerative heat exchange with hot reaction medium 18 from reaction chamber 14. The preheat can also be accomplished by an external source, such as electricity, or a fired heater, or a combination thereof. In the embodiment illustrated in FIG. 1, the water 38/oxidant 25 mixture is preheated to above about 374° C. Alternately, for example, the water 38/oxidant 25 mixture could enter the reactor 12 at ambient temperature or below 374° C. As the water 38/oxidant 25 mixture leaves the preheater 50, it is mixed with the reactant 20 and auxiliary fuel 24 from the line 36.

The type of additive 16 utilized depends upon the type of feed material 11 utilized. Further, the location where the additive 16 is added to the system 10 can be varied. A more complete discussion of possible additives 16 is provided below.

In the embodiment illustrated in FIG. 1, the additive 16 is drawn from an additive source 49 by pump 51 and transferred into line 53. The additive 16 leaves line 53 and mixes with the feed material 11 at junction 52. Subsequently, the feed material 11, including the combination of reactant 20, auxiliary fuel 24, water 38, and oxidant 25 and the additive 16 are then introduced into the reaction chamber 14 via a duct 54. Depending upon the design of the system 10, the feed material 11 and additive 16 mixture can enter the reaction chamber 14 above 374° C. or below 374° C.

Depending upon the particular reactant 20, it may be important to use a high shear mixer at the junction 52 to mix the feed/fuel stream from line 36, the water/oxidant stream from the preheater 50 and the additive 16 from line 53. For example, if the reactant 20 is largely water insoluble, high shear mixing is desirable to ensure sufficient mixing of combustible materials and the oxidant 25.

Figure 2:
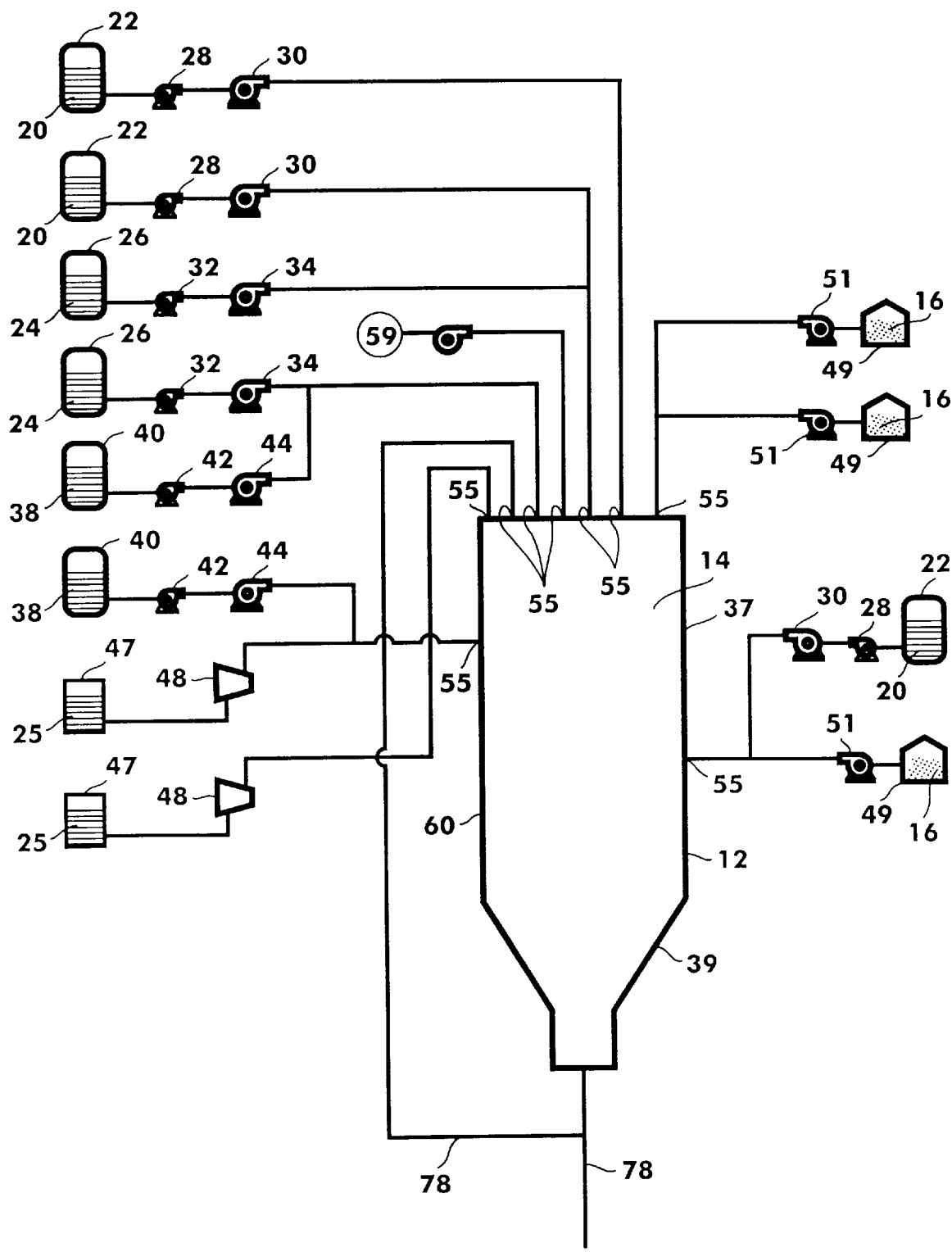
FIG. 2 is a schematic diagram of a portion of an alternate embodiment of the system.

The location of mixing of the various constituents of the feed material 11 and additive(s) 16 can vary according to the design of the system 10. For example, the additive(s) 16 can be added to some or all of the constituents of the feed material 11 prior to entry into the reaction chamber 14 or after entry into the reaction chamber 14. FIG. 2 illustrates a simplified diagram of a portion of a system 10 which uses separate inlets 55 for introducing one or more of the constituents of the feed material 11 and the additives 16 into the reaction chamber 14. The embodiment includes three additives 16, three reactants 20, two auxiliary fuels 24, two waters 38 and two oxidants 25. In this embodiment, (i) two of the additives 16 are mixed together prior to being released into the reaction chamber 14, (ii) one reactant 20 is released directly into the reaction chamber 14, (iii) one reactant 20 is mixed with one of the auxiliary fuels 24 prior to being released into the reaction chamber 14, (iv) one auxiliary fuel 24 and one water 38 are mixed together prior to being released into the reaction chamber 14, (v) one water 38 and one oxidant 25 are mixed together prior to being released into the reaction chamber 14 downstream of the top 37 of the reactor 12, (vi) one oxidant 25 is released directly into the reaction chamber 14, and (vii) one of the additives 16 is mixed with one of the reactants 20, prior to being introduced into the reactor 12 through a porous wall 60 of the reactor 12. Alternately, for example, a separate inlet could be used for each reactant 20, auxiliary fuel 24, the water 38, the oxidant 25, and additive 16.

Further, FIG. 2 also illustrates the inert particles 59, such as alumina, can also be added to the reaction chamber 14. Moreover, a portion of the effluent 78 from the system 10 illustrated in FIG. 2 is directed back into the reaction chamber 14.

Each inlet 55 can be a nozzle which releases the fluid into the reaction chamber 14. The inlets 55 can be inclined towards each other so that the various fluids collide within the reaction chamber 14.

Figure 3:
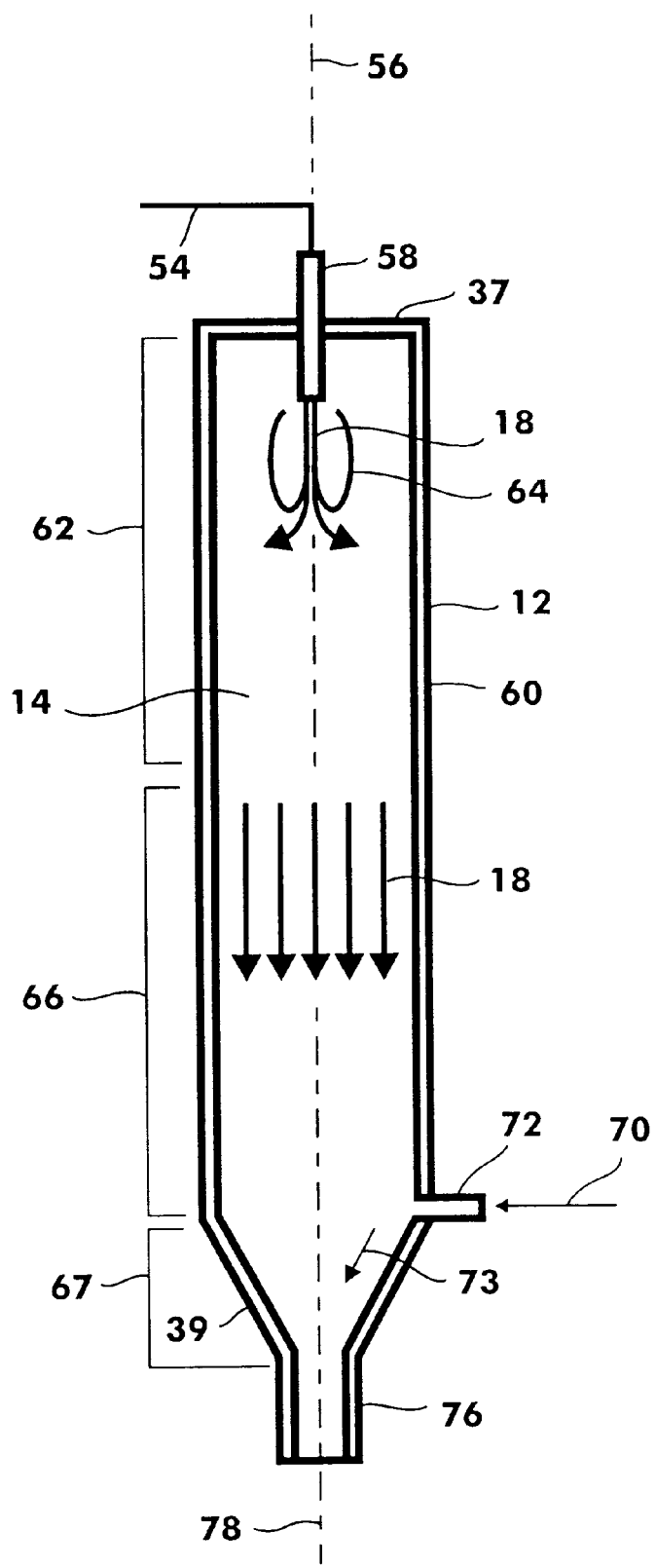
FIG. 3 is a schematic cross-sectional representation of a reactor for the present invention.

FIG. 3 illustrates a downflow reactor 12 having unidirectional flow of reaction medium 18. The overall average flow of the reaction medium 18 in the reaction chamber 14 is in a substantially linear, downward direction. In this embodiment, the reactor 12 and reaction chamber 14 generally define a longitudinal axis 56. It is preferable that this longitudinal axis 56 of reactor 12 be vertically oriented with the top end 37 directly above the bottom end 39. With this orientation, all of the material that is to be introduced into the reaction chamber 14 through the duct 54 is passed through a nozzle 58. The nozzle 58 introduces the reaction medium 18 into the reaction chamber 14 of the vessel 12 in a direction which is substantially along the axis 56.

The nozzle 58, for example, can introduce a straight single jet of the reaction medium 18. In this embodiment, the material from nozzle 58 is directed so as not to directly impinge on the walls 60 of the reaction chamber 14. This further minimizes build up of solid materials on the walls 60 of the reaction chamber 14.

In the embodiment illustrated in FIG. 3, the reaction medium 18 is introduced into the top end 37 of the reaction chamber 14 where it is subjected to vigorous back-mixing. Specifically, the flow of the reaction medium 18 in this back-mixing section 62 is characterized by turbulence in the reaction medium 18 that results from entraining shear forces and eddies 64 which are set up as the feed material 11 and the additive 16 enter into the reaction chamber 14. The reaction medium 18 is thus rapidly brought above the supercritical temperature of three hundred seventy-four degrees Celsius (374° C.) and rapid reaction commences. Further, while the present system 10 avoids direct impingement of the reaction medium 18 onto the walls 60, heat transfer from the walls 60 in the back-mixing section 62 can assist in the propagation of the reaction within the vessel 12.

The embodiment illustrated in FIG. 3 also includes a plug flow section 66 below the back-mixing section 62 in reaction chamber 14. This plug flow section 66 is characterized by no large scale back-mixing of the reaction medium 18 in the lower portion of the reaction chamber 14. The flow of the reaction medium 18 in the plug flow section 66, however, does exhibit local turbulent mixing.

The embodiment illustrated in FIG. 3 also includes a quenching section 67 below the plug flow section 66 to cool the reaction medium 18. It may be desirable to quench the reaction medium 18 for a number of reasons, including to re-dissolve some or all of the water soluble solids that may have developed during the reaction, to allow the use of the lesser materials outside the reactor 12, and/or to adjust the pH of the effluent stream 78.

Returning back to FIG. 1, it can be seen that a high pressure pump 68 withdraws water from holding tank 40 and passes it along via line 70 to an input duct 72. The water injected through duct 72 is used as a quenching fluid 73 for cooling the reaction medium 18 in the quenching section 67. Specifically, the quenching fluid 73 mixes with the reaction medium 18 and may re-dissolve some or all of the water soluble solids which developed during reaction in the reaction chamber 14. This quenching occurs in the quench section 67 (see FIG. 3), but above the exit port 76, so that the reaction medium 18 can pass through exit port 76 and into the line 82 without causing plugging or fouling of the exit port 76.

Fluids such as high pressure gas, rather than water, can be used as a quenching fluid 73. Also, water from an external source, or relatively dirty water (e.g., sea water), or cool, recycled reaction stream can be used as a quenching fluid 73. Additionally, the quenching fluid 73 should be relatively cool when compared to the reaction medium 18.

Further, it is contemplated by the present invention that the quenching duct 72 can be oriented to direct the quenching fluid 73 directly toward the exit port 76. Thus, the momentum of the quenching fluid 73 can be used to assist in clearing the exit port 76.

Figure 4A:
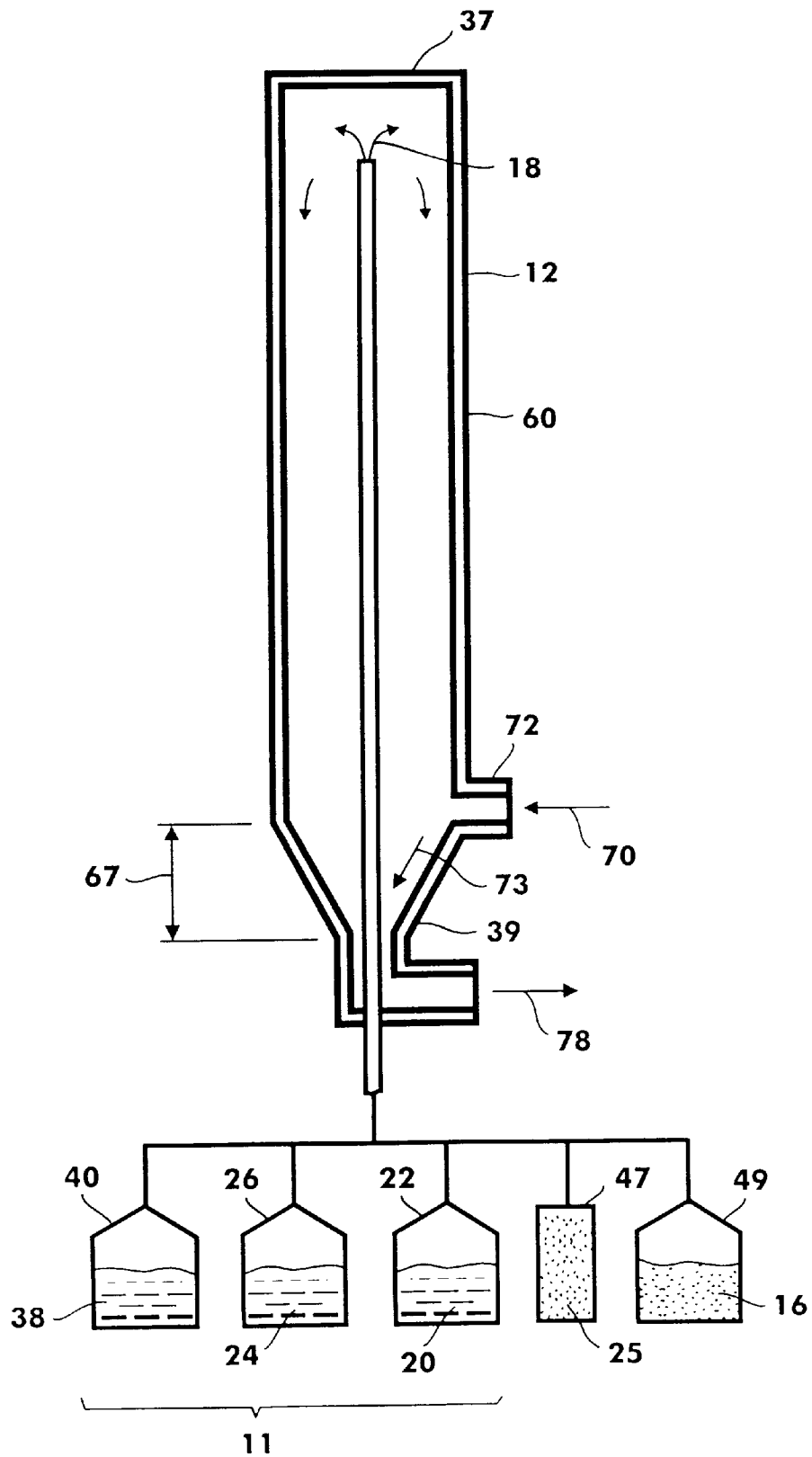
FIG. 4A is a schematic cross-sectional representation of another reactor having features of the present invention.
Figure 4B:
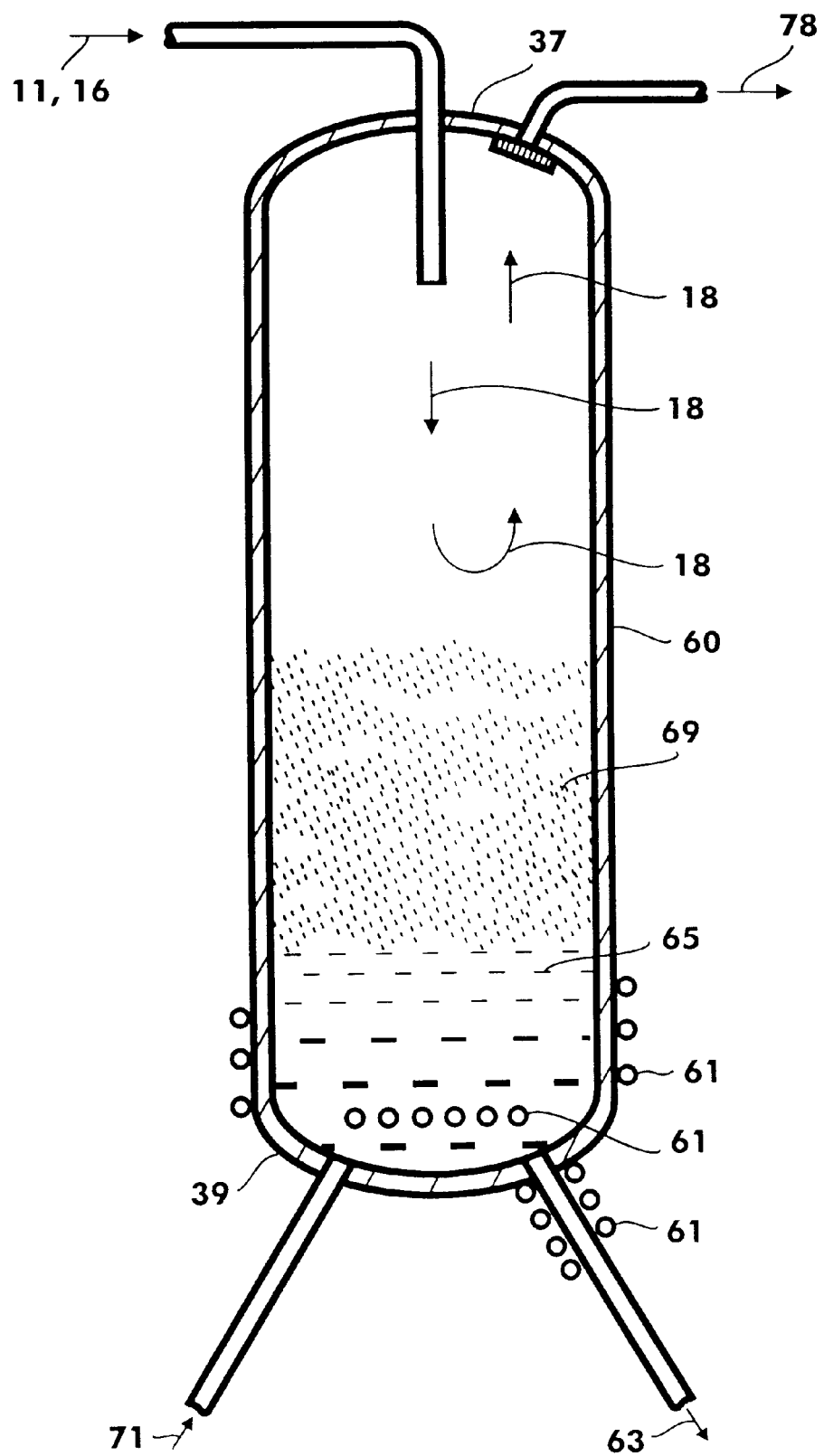
FIG. 4B is a schematic cross-sectional representation of yet another reactor having features of the present invention.

FIGS. 4A and 4B each illustrate a reactor 12 having reversing flow. In particular, in FIG. 4A, the combination of the feed material 11 and the additive 16 initially are directed upward towards the top end 37 of the reactor 12. Subsequently, the reaction medium 18 reverses direction and flows downward towards the bottom end 39 of the reactor 12. The reactor 12 illustrated in FIG. 4 also includes a quenching section 67.

In FIG. 4B, the combination of the feed material 11 and additive 16 are added at the top 37 of the reactor 12. Initially, the reaction medium 18 moves downward in the reaction chamber 14. Subsequently, the reaction medium 18 reverses direction and the reactor effluent 78 exits near the top 37 of the reactor 12. Dense matter in the reaction medium 18 which is insoluble continues along the original downward flow path due to a combination of inertia and gravity. There is a somewhat diffused boundary illustrated by the shading 69. Pressurized fluid 69 such as water may be admitted into the reactor 12 to create a brine pool 65 near the bottom 39 of the reactor 12. The brine 63 can be removed at the bottom 39 of the reactor. Additionally, chillers 61 can be used to cool the brine 63.

Figure 5:
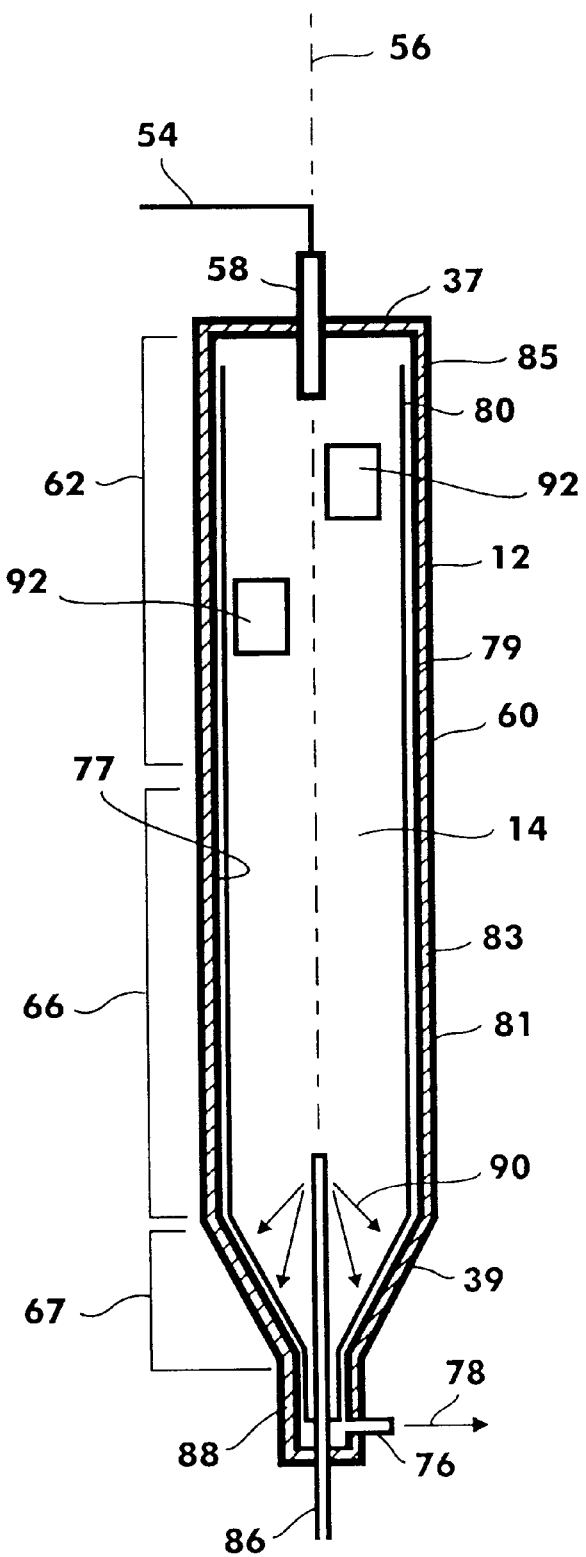
FIG. 5 is a schematic cross-sectional representation of an alternate embodiment of the reactor for the present invention.

The reactors 12 shown in FIGS. 3 and 4 are each simple, single-walled vessels. Alternately, as illustrated in FIG. 5, the reactor 12 may include an inner wall 79 and a pressure bearing wall 81. The inner wall 79 can include a corrosion resistant liner 77. Further, the inner wall 79 can be isolated from the pressure bearing wall 81 or pressure shell. In this design, insulating material 85 may be included in a gap 83 between the inner wall 79 and the pressure bearing wall 81 in order to allow the pressure bearing wall 81 to operate at a relatively low temperature. Furthermore, as with the liner 77, the surfaces in contact with the process may be comprised of a corrosion resistant material, or coated with a corrosion resistant material. Suitable corrosion resistant materials include titanium, platinum, iridium, titania, and zirconia.

Figure 6:
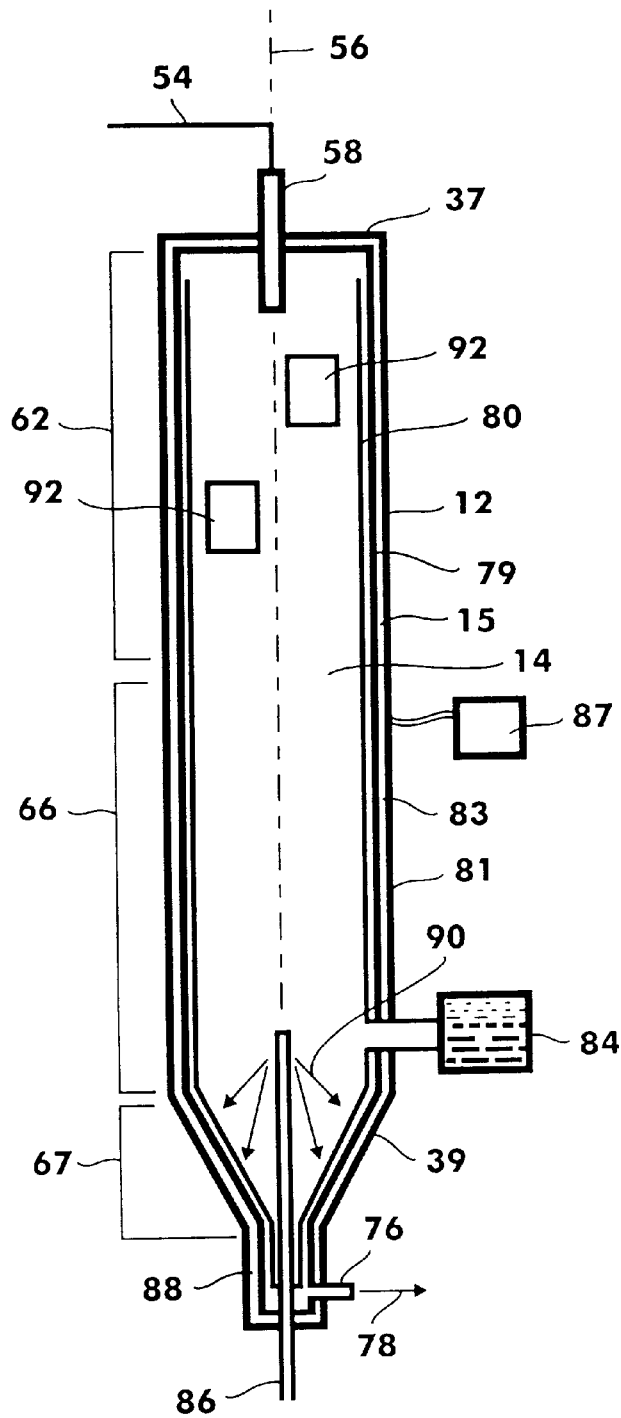
FIG. 6 is a schematic cross-sectional representation of yet another embodiment of the reactor for the present invention.

Alternately, as shown in FIG. 6, a purge fluid 84, such as air, nitrogen, or water can be released into the gap 83 between the inner wall 79 and the pressure bearing wall 81 to keep contaminants from flowing into the gap 83. Further, a monitor 87 can be used to detect a breach or damage to the inner wall 79. In the embodiment illustrated in FIG. 6, the monitor 87 detects damage by monitoring the pressure in the gap 83.

Several additional, alternative structures are presented for the reactor 12 in FIGS. 5 and 6. Specifically, an alternate quenching section 67 is shown. For the alternate quenching section 67, a hollow central shaft 86 is inserted into the reaction chamber 14 through an access 88 at the bottom 39 of the chamber 14. A quenching spray 90 can then be directed toward access 88 for quenching the reacted material before it is withdrawn through exit port 76 as reactor effluent 78. As is intended for the present invention this quenching results, as indicated above, by lowering temperatures to the point where water soluble solids in the reaction medium 18 (shown in FIG. 2) may be re-dissolved and can be flushed from the bottom end 39 of the reaction chamber 14.

Attached to the hollow central shaft 86 is a mechanical device, i.e. scraper device 80 for clearing the walls 60 of the reactor 12. This scraper device 80 is substantially cylindrical and extends along the side walls 60 of the reactor 12. The scraper device 80 is moved by rotation of the hollow central shaft 86 to remove solid deposits from the walls 60 of the reactor. The scraper device 80 may be of a blade-type design or any other workable geometry. For example, the scraping device 80 may include a cylinder with multiple cut-outs 92, i.e., openings in the cylinder. The cut-outs 92, shown in FIGS. 5 and 6, are for exemplary purposes only. Alternatively, a scraper utilizing axial or oscillatory movement rather than rotational movement may be employed. With the axial design, it is possible to have the scraper element submersed in quenched fluid when in the retracted position, allowing the element to be kept free of solid deposits. In an alternate embodiment, an auger type device (not shown) might be used to dislodge solids from the walls 60 and/or the exit port 76. Another alternate design could utilize more than one exit from the reaction chamber 14, proximate the bottom end 39.

Returning to FIG. 1, it will be seen that as the reactor effluent 78 is removed from the reactor 12, it is passed through the line 82 to a cooler 96. As contemplated for system 10, the cooler 96 may use regenerative heat exchange with cool feed material, or heat exchange with ambient or pressurized air, or a separate water supply such as from a steam generator (not shown). Once cooled by the cooler 96, the high pressure reactor effluent 78 is then depressurized. Alternately, the gas and liquid in the reactor effluent 78 can be separated prior to depressurization. Depressurization can be accomplished by using a variety of means, such as high pressure gas-liquid separator 98, a capillary 98, a pressure control valve or an orifice.

After the effluent 78 from the reaction chamber 14 has been both cooled by the cooler 96 and depressurized by capillary 98, it can be sampled through the line 100. Otherwise, the effluent 78 is passed through the line 102 and into the liquid-gas separator 104. To allow accumulation of a representative sample in separator 104, it can be diverted to either tank 106 during startup of the system 10, or to tank 108 during the shutdown of system 10. During normal operation of the system 10, the line 110 and valve 112 can be used to draw off liquid 114 from the collected effluent. Additionally, gas 116 from the headspace of separator 104 can be withdrawn through the line 118 and sampled, if desired, from the line 120. Alternatively the gas 116 can be passed through the filter 122 and valve 124 for release as a nontoxic gas 126 into the atmosphere. As will be appreciated by the person of ordinary skill in the pertinent art, a supply tank 128 filled with an alkali neutralizing agent 130 can be used and the agent 130 introduced into the separator 104 via line 132 to counteract any acids that may be present.

The present invention recognizes that phosphate assists in the transport of precipitating salts in the reactor 12 and inhibits excessive build-up of salts in the reactor 12. Further, as a result of the present invention, corrosive elements in the reaction medium 18 can be neutralized because the phosphate allows any precipitants, created by neutralization, to be transported through the reactor.

As provided above, the additive 16 can be added to the reaction chamber 14 in one or more locations. For example, the additive 16 can be added to the reaction chamber 14 with the feed material 11 or separate from the feed material 11. Moreover, the additive 16 can be added as one or more feed streams to the reaction chamber 14.

The additive 16 adjusts the composition of the reaction medium 18 so that the reaction medium 18 contains phosphate salt. Preferably, the phosphate salt includes a monobasic phosphate salt such as mono-sodium phosphate. The adjustment to the reaction medium 18 can be made with an additive 16 which includes one or more (i) phosphate salts, (ii) phosphorus containing compounds, (iii) phosphoric acids, (iv) organo-phosphates, (v) neutralizing compounds, (vi) neutralizing agents, and/or (vii) a combination thereof.

The exact percentage of phosphate in the reaction medium 18 depends upon the type of feed material 11 utilized and the type of additive 16 utilized. It is anticipated that a phosphate concentration of between approximately 10 and 100 percent by weight of the total salts in the reaction medium 18 will significantly inhibit build-up of precipitating salts. Preferably, the amount of phosphate in the reaction medium 18 is between 10 and 100 percent by weight of the total salts in the reaction medium 18.

A suitable phosphate compound can be selected from a group which includes $H_3PO_4$, $NaH_2PO_4$, $Na_2HPO_4$, $Na_3PO_4$, $(NH_4)_3PO_4$, $(NH_4)_2HPO_4$, $(NH_4)H_2PO_4$. Alternately, the phosphate compound can be selected from a group which includes $KH_2PO_4$, $K_2HPO_4$, or $K_3PO_4$.

A suitable neutralizing compound can be selected from a group which includes NaOH, $NaHCO_3$, $Na_2CO_3$, KOH, $KHCO_3$, $K_2CO_3$, $Ca(OH)_2$, CaO, $CaCO_3$, $NaNO_3$, $NaNO_2$, $KNO_3$, $KNO_2$, $Ca(NO_3)_2$, $Na_3PO_4$, $Na_2HPO_4$, $KPO_4$, and $K_2HPO_4$. Alternately, the neutralizing compound can be selected from a group which includes $H_3PO_4$, HCl, $H_2SO_4$, HF, $NH_4Cl$, $NH_4ClO_4$, $(NH_4)_3PO_4$, $(NH_4)_2PO_4$, and $(NH_4)H_2PO_4$. Still alternately, the neutralizing compound can be an organic compound which contains one or more of the elements chlorine (Cl), sulfur (S), phosphorus (P), or fluorine (F). In yet another alternate embodiment, the neutralizing compound can be an organic salt.

The specific type of additive utilized, varies according to the type of feed material 11 which is being processed. For example, if the feed material 11 is acidic or contains acid generating compounds, then the additive 16 can include a neutralizing agent and a phosphate generating compound. Alternately, an additive 16 including a phosphate compound containing neutralizing cations such as $Na_2HPO_4$ or $Na_3PO_4$ can be added to an acidic feed material 11 so that the resulting reaction medium 18 contains some mono-basic phosphate and the other acids are neutralized to salts. Still alternately, an additive 16 including a combination of a neutralizing agent and a cation containing phosphate compounds could be used with an acidic feed material 11.

If the feed material 11 contain bases or base generating compounds, then the additive 16 can include an acid-generating compound to reduce the pH level to less than approximately 7. If the feed material 11 already contains phosphate, the additive 16 can include a neutralizing compound to insure that the reaction medium 18 includes mono-basic phosphate (typical effluent pH level of approximately 1 to 7), without fully neutralizing to dibasic phosphate (typical effluent pH level of greater than approximately 8).

The additive 16 can include a separate neutralizing agent, added to the feed material 11. Alternately, the additive 16 can be used to aid in the transport of salt and as neutralizing agent by providing phosphorus. This can be done for a feed material 11 which contains bases or base generating compounds with $H_3PO_4$, ammonium phosphate, and/or an organo-phosphorus compound. Alternately, this can be done for a feed material which contains acids or acid generating compounds with phosphate salts, $Na_3PO_4$, $Na_2HPO_4$, $K_3PO_4$, $K_2PO_4$, or phosphorus containing salts.

As indicated above, it is an important characteristic of the present invention that plugging and build up of precipitating salts in the reaction chamber 14 are minimized with an additive 16 which causes the reaction medium 18 to contain phosphate. It is to be appreciated that the phosphate inhibits the build-up of sticky, precipitating salts in the reaction chamber. This allows for continuous, steady-state operation of the reactor 12 without shutdowns to clean the reaction chamber 14.

While the goal of the present invention is frequently a high degree of oxidation, the methods of the present invention will also be useful in similar applications where partial or no oxidation is desired. In the latter case, the feed material 11 is reformed by hydrolysis. Examples of such reforming processes include U.S. Pat. No. 3,850,738, which describes the production of liquid organics from coal and U.S. Pat. No.

4,113,446, which describes the production of gaseous materials from various organic feedstocks. Both of these patents utilize supercritical water conditions.

Figure 7:
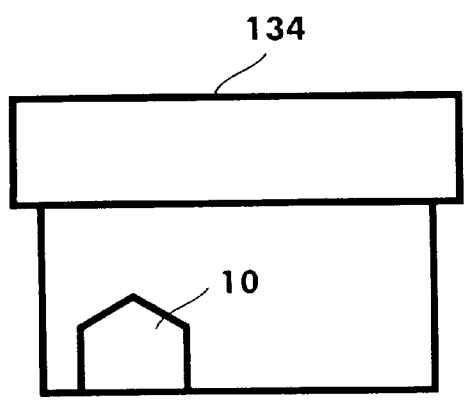
FIG. 7 is an illustration of a treatment facility which utilizes a system having features of the present invention.

FIG. 7 illustrates a treatment facility 134 which can utilize the system 10 having features of the present invention. The treatment facility 134 can use the system 10 to produce power, destroy waste, convert waste to useful products, and/or convert one or more of reactants 20 to a useful product.

EXAMPLE

The following example has been tested in a reactor 12 and is indicative of the results attainable by the system 10. A feed material 11 which contained an 2:1 molar ratio of NaCl to $Na_2SO_4$ plugged the reactor 12 operating at 600° C. and 3400 psi after about 42 minutes of operation without an additive 16. A feed material 11 containing a 2:1 molar ratio of NaCl to $Na_2SO_4$ was modified by the addition of the additive 16, $NaH_2PO_4$ so that approximately ten percent of the total salts in the reaction medium 18 include phosphate. The addition of the additive 16 aided the transport of salts and there was no plugging of the reactor 12.

While the particular hydrothermal treatment method and system 10 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A method for hydrothermal processing a feed material containing water soluble salts in a reaction chamber to inhibit a buildup of salts in the reaction chamber under supercritical water temperatures, the method comprising the step of:
    producing a reaction medium in the reaction chamber which contains a mono basic phosphate for transporting the salts through the reaction chamber, by providing an additive with at least a portion of the feed material, the reaction medium reaching supercritical water temperatures with a temperature of at least approximately 374° C. and a pressure of at least approximately 25 bar in the reaction chamber, hydrothermally processing said feed material at said temperature and said pressure, and transporting said salts through said reaction chamber.

2. The method of claim 1 wherein the step of producing a reaction medium includes producing a reaction medium wherein at least approximately one percent by weight of the total salts in the reaction medium includes phosphate.

3. The method of claim 1 wherein the step of producing a reaction medium includes producing a reaction medium wherein at least approximately 10 percent by weight of the total salts in the reaction medium includes phosphate.

4. The method of claim 1 wherein the step of producing a reaction medium includes producing a reaction medium which includes mono-sodium phosphate.

5. The method of claim 1 further comprising the step of providing an additive which includes at least one phosphate compound.

6. The method of claim 1 further comprising the step of providing an additive which includes a phosphate compound selected from the group consisting of $H_3PO_4$, $NaH_2PO_4$, $Na_2HPO_4$, $Na_3PO_4$, $(NH_4)_3PO_4$, $(NH_4)_2HPO_4$, $(NH_4)H_2PO_4$.

7. The method of claim 1 further comprising the step of providing an additive which includes a phosphate compound selected from the group consisting of $KH_2PO_4$, $K_2HPO_4$, or $K_3PO_4$.

8. The method of claim 1 further comprising the step of providing an additive which includes at least one neutralizing compound.

9. The method of claim 1 further comprising the step of providing an additive which includes a neutralizing compound selected from the group consisting of NaOH, $NaHCO_3$, $Na_2CO_3$, KOH, $KHCO_3$, $K_2CO_3$, $Ca(OH)_2$, CaO, $CaCO_3$, $NaNO_3$, $NaNO_2$, $KNO_3$, $KNO_2$ $Ca(NO_3)_2$, $Na_3PO_4$, $Na_2HPO_4$, $K_3PO_4$, and $K_2HPO_4$.

10. The method of claim 1 further comprising the step of providing an additive having a neutralizing compound which includes an organic salt.

11. The method of claim 1 further comprising the step of providing an additive which includes a neutralizing compound selected from the group consisting of $H_3PO_4$, HCl, $H_2SO_4$, HF, $NH_4Cl$, $NH_4ClO_4$, $(NH_4)_3PO_4$, $(NH_4)_2HPO_4$, and $(NH_4)H_2PO_4$.

12. The method of claim 1 further comprising the step of providing an additive which includes a neutralizing compound which contains at least one element selected from the group consisting of chlorine, sulfur, phosphorus, and fluorine.

13. The method of claim 1 further comprising the step of providing an additive which includes at least one neutralizing compound and at least one phosphate salt.

14. The method of claim 1 further comprising the step of adding the additive directly to the reaction chamber.

15. The method of claim 1 further comprising the step of adding the additive to the reaction chamber in a first location and the step of adding the feed material to the reaction chamber in a second location.

16. The method of claim 1 further comprising the step of mixing at least a portion of the additive with at least a portion of the feed material to form an additive/feed material mixture and the step of adding the additive/feed material mixture to the reaction chamber.

17. The method of claim 1 including the step of providing a feed material which includes an oxidant selected from the group which includes air, oxygen, $H_2O_2$, $HNO_3$, $HNO_2$, $NaNO_3$, $NaNO_2$, $NH_4NO_3$, $NH_4NO_2$, $KMnO_4$, $NH_4ClO_4$.

18. The method of claim 1 including the step of providing the feed material to the reaction chamber at a temperature below 374° C.

19. The method of claim 1 including the step of preheating at least a portion of the feed material to above an ambient temperature prior to the step of producing a reaction medium.

20. A method for hydrothermal processing a feed material containing water soluble salts in a reaction chamber to inhibit a buildup of salts in the reaction chamber under supercritical water temperatures, having a temperature of above approximately 374° C. and a pressure of above approximately 25 bar, the method comprising the steps of:
    releasing a feed material into the reaction chamber; and
    mixing an additive with the feed material so that a reaction medium in the reaction chamber contains a mono basic phosphate for transporting the salts through the reaction chamber, hydrothermally processing said feed material at said temperature and said pressure, and transporting said salts through said reaction chamber.

21. The method of claim 20 wherein the step of mixing the additive occurs prior to the step of releasing the feed material.

22. The method of claim 20 wherein the step of mixing the additive occurs after the step of releasing the feed material.

23. The method of claim 20 wherein the step of mixing results in producing a reaction medium wherein at least approximately one percent by weight of the total salts in the reaction medium includes mono basic phosphate.

24. The method of claim 20 wherein the step of mixing results in producing a reaction medium wherein at least approximately 10 percent by weight of the total salts in the reaction medium includes mono basic phosphate.

25. The method of claim 20 wherein the step of mixing results in producing a reaction medium which includes mono-sodium phosphate.

26. The method of claim 20 wherein said mono basic phosphate is $Na_2HPO_4$.

27. The method of claim 20 wherein said mono basic phosphate is $K_2HPO_4$.

28. The method of claim 20 further comprising the step of providing an additive which includes at least one neutralizing compound.

29. The method of claim 20 further comprising the step of providing an additive which includes a neutralizing compound selected from the group consisting of NaOH, $NaHCO_3$, $Na_2CO_3$, KOH, $KHCO_3$, $K_2CO_3$, $Ca(OH)_2$, CaO, $CaCO_3$, $NaNO_3$, $NaNO_2$, $KNO_3$, $KNO_2$, $Ca(NO_3)_2$, $Na_3PO_4$, $Na_2HPO_4$, $K_3PO_4$, and $K_2HPO_4$.

30. The method of claim 20 further comprising the step of providing an additive having a neutralizing compound which includes an organic salt.

31. The method of claim 20 further comprising the step of providing an additive which includes a neutralizing compound selected from group consisting of $H_3PO_4$, HCl, $H_2SO_4$, HF, $NH_4Cl$, $NH_4ClO_4$, $(NH_4)_3PO_4$, $(NH_4)_2HPO_4$, and $(NH_4)H_2PO_4$.

32. The method of claim 20 further comprising the step of providing an additive which includes a neutralizing compound which contains at least one element selected from the group consisting of chlorine, sulfur, phosphorus, and fluorine.

33. The method of claim 20 further comprising the step of providing an additive which includes at least one neutralizing compound and at least one mono basic phosphate salt.

* * * * *